(12) United States Patent
Feher

(10) Patent No.: US 7,628,586 B2
(45) Date of Patent: Dec. 8, 2009

(54) IMPELLER

(75) Inventor: Timothy A. Feher, Belle Vernon, PA (US)

(73) Assignee: Elliott Company, Jeannette, PA (US)

( * ) Notice: Subject to any disclaimer, the term of this patent is extended or adjusted under 35 U.S.C. 154(b) by 498 days.

(21) Appl. No.: 11/320,432

(22) Filed: Dec. 28, 2005

(65) Prior Publication Data

US 2007/0147999 A1 Jun. 28, 2007

(51) Int. Cl.
*F03B 3/12* (2006.01)
(52) U.S. Cl. .............................. 416/186 R; 415/170.1; 415/200
(58) Field of Classification Search .............. 415/199.1, 415/122.1, 124.1, 170.1, 174.4, 200, 224.5, 415/111, 229; 29/889.23; 416/186 R, 188
See application file for complete search history.

(56) References Cited

U.S. PATENT DOCUMENTS

| | | | | |
|---|---|---|---|---|
| 2,480,807 | A | * | 8/1949 | De Vlieg ................. 29/889.23 |
| 2,909,966 | A | * | 10/1959 | Barens ..................... 409/117 |
| 3,224,078 | A | | 12/1965 | Mayne |
| 3,267,870 | A | | 8/1966 | Blomgren, Sr. et al. |
| 3,285,187 | A | * | 11/1966 | Anderson, Jr. ............ 416/183 |
| 3,541,607 | A | * | 11/1970 | Greene .................... 415/112 |
| 3,642,379 | A | * | 2/1972 | Swearingen ............. 415/119 |
| 3,802,046 | A | | 4/1974 | Wachtell et al. |
| 4,428,717 | A | | 1/1984 | Catterfeld |
| D355,253 | S | | 2/1995 | Jansen et al. |
| 5,438,755 | A | * | 8/1995 | Giberson ................. 29/889 |
| 6,146,094 | A | | 11/2000 | Obana et al. |
| 6,210,116 | B1 | | 4/2001 | Kuczaj et al. |
| 6,220,819 | B1 | | 4/2001 | Chien et al. |
| 6,276,899 | B1 | | 8/2001 | Lambert et al. |
| 6,296,445 | B1 | | 10/2001 | Chasseguet et al. |
| 6,435,828 | B1 | | 8/2002 | Bostwick |
| 6,503,057 | B1 | | 1/2003 | Tsui |
| 6,506,024 | B1 | | 1/2003 | Thompson et al. |
| 6,537,030 | B1 | | 3/2003 | Garrison |
| 6,592,329 | B1 | * | 7/2003 | Hirose et al. ............. 416/203 |
| 6,638,020 | B1 | | 10/2003 | Tsui |
| 6,935,838 | B1 | * | 8/2005 | Wang ..................... 415/199.1 |
| 2003/0133801 | A1 | | 7/2003 | Orocio et al. |
| 2003/0198556 | A1 | | 10/2003 | Kim |
| 2003/0231959 | A1 | | 12/2003 | Snider |
| 2004/0018089 | A1 | | 1/2004 | Illingworth et al. |
| 2006/0280609 | A1 | | 12/2006 | Ranz et al. |

FOREIGN PATENT DOCUMENTS

| | | |
|---|---|---|
| DE | 36 11 910 A1 | 10/1987 |
| DE | 199 12 715 A1 | 9/2000 |
| EP | 1 396 309 A | 3/2004 |

* cited by examiner

*Primary Examiner*—Igor Kershteyn
(74) *Attorney, Agent, or Firm*—The Webb Law Firm

(57) ABSTRACT

An impeller including a plurality of longitudinally-extending blades, each having a first edge and a second edge, a cover member with an inlet orifice and extending along at least a portion of the first edge of each of the plurality of blades, and a hub member extending adjacently along only a portion of the second edge of each of the blades. The cover member, plurality of blades and hub member are milled from a single, metal-based material of construction to form an integral, uniform structure. A kit for an impeller assembly and a method of manufacturing an impeller are also disclosed.

19 Claims, 4 Drawing Sheets

IMPELLER

BACKGROUND OF THE INVENTION

1. Field of the Invention

The present invention relates generally to impellers for use in pumping systems, compressors and the like and, in particular, to a precision milled impeller having a cover member, a hub member and multiple blades extending therebetween.

2. Description of Related Art

Impellers can be used in many different applications. For example, impellers could be used in connection with a blower, a compressor, a centrifugal pump or compressor, generators, water pumps, transmission mechanisms, refrigerant compressors, etc. While the design of the impeller in most applications is generally similar, there are many internal and external factors that should be considered when precisely designing and manufacturing an impeller for any of the different applications, such as for a centrifugal compressor which requires increased integrity of the critical flow path during operation. In addition, in such an application, the blades or vanes must have sufficient rigidity and minimal stress and other failure points.

Generally, impellers come in one-piece, two-piece or three-piece designs. For example, as seen in U.S. Pat. No. 6,146,094 to Obana et al., an impeller according to the prior art is illustrated. As best seen in FIG. 1 of the Obana patent, the impeller includes a front plate 101 and blades 103. The front plate 101 and the blades 103 are formed as a monolithic structure from a single piece of material. The front plate 101 includes a suction opening 801, and a separate back plate 102 is attached to the structure opposite the front plate 101 and blades 103. Accordingly, the blades 103 are sandwiched between the front plate 101 and the back plate 102. The blades 103 of the Obana patent are curved in what is commonly referred to as a three-axis structure or arrangement.

The front plate 101, the back plate 102 and the blades 103 define multiple air outlets 802, such that when the impeller is rotated, air is sucked through the suction opening 80 into the impeller, and is discharged through the air outlets 802 toward, in this case, an electric motor, in order to cool the motor. In one embodiment, the front plate 101 and the blades 103 are formed in a monolithic structure by an injection molding process, and the back plate 102 is bonded to the blades 103 along the entire length of the blades by brazing. Specifically, an inner surface of the back plate 102 is coated with a brazing metal layer 201, and the front plate 101, which is integral with the blades 103, are held against the back plate 102 and heat is applied such that the back plate 102 bonds to the blades 103 by brazing.

Another impeller design is described in Patent Application Publication No. US 2003/0133801 to Orocio et al. As with the impeller of the Obana patent, the impeller of the Orocio reference is also integrally formed and molded in a single operation. The impeller of the Orocio reference is designed for use in connection with a centrifugal pump, where rotation of the impeller causes liquid supplied to the inlet or center area of the impeller to be radially accelerated and dispensed from the periphery of the impeller.

The impeller of the Orocio reference includes a shroud 36 with an annular inlet ring 38 centrally formed with the shroud 36. Mounted on the inside surface of the shroud 36 are multiple vanes 42, which are, as discussed above, of a three-axis design and structure. A cover 46 is placed about the hub 44 and is welded or otherwise secured to the vanes 42. Liquid is passed through passage 29 of the inlet conduit 30 and deposited within eye 48 of the pump impeller 34. By rotating the pump impeller 34, liquid is drawn from passage 29 into enclosing chamber 37 and propelled radially outwardly past peripheral edge 35 through vane openings 33 into discharge passes 31 of the discharge conduit 28. The pump impeller 34 of the Orocio reference is molded in a one-step molding operation.

These prior art impellers have many drawbacks. For example, the impeller of the Obana patent would be considered a two-piece impeller, where the front plate 101 and the blades 103 are formed as a monolithic structure, and the back plate 102 subsequently attached thereto. While the impeller of the Orocio reference discusses creating the shroud, vanes and shaft sleeve as a single structure for alignment purposes, as with the impeller of the Obana patent, the impeller of the Orocio reference is a molded piece. Such molded pieces exhibit many deficiencies and cannot be used in various high-end applications where greater precision is required. In particular, such molded pieces are "sloppy" and exhibit limited output when used in high volume applications. In addition, neither of the impellers of the Obana patent nor the Orocio reference are formed with precision blades or vanes of the five-axis type, as such blades, which make a 90-degree turn from leading edge to opposing edge, would not exhibit appropriate stabilization characteristics and could not be manufactured in a molding process to achieve such characteristics.

Impellers for high-speed compressor applications, such as multi-stage centrifugal compressors, are, as discussed above, in the form of two circular disks separated by and sandwiching radially extending vanes or blades. These vanes define spiral passageways between the disks that form the impeller, and fluids in the passageways are directed outward toward the outer periphery of the disks as the disks rotate. When forming such impellers for high volume or high-speed applications, and when forming these impellers from various metallic or metal-based materials, the fabrication process according to prior art exhibits many deficiencies.

According to the prior art, furnace brazing is utilized, where one disk or cover is provided with integrally-formed vanes extending from the surface, and this disk is manufactured by a machine by milling the disk and vanes from a single piece of metal. Next, the back cover is attached in a brazing process, where a surface of the cover to be attached includes a material with a melting point below that of the disks and vanes. The impeller is placed in a furnace, and as the impeller components heat, the brazing material melts and the disks are forced together. Oftentimes, excess brazing material forms a ridge or other obstruction in the fluid passageways of the impeller. In addition, the impellers exhibit some residual internal stresses due to the expansion, braze solidification and subsequent uneven contraction of the parts. Further, as discussed above, the disruptions of the brazing material disrupts the characteristics of the impeller in the fluid passage therein. The strength of the brazed joints is much less than the strength of the material it joins, and therefore fatigue and fractures occur.

SUMMARY OF THE INVENTION

It is, therefore, an object of the present invention to provide an impeller and a method of manufacturing an impeller that overcomes the deficiencies of the prior art. It is another object of the present invention to provide an impeller and a method of manufacturing an impeller that provides a precisely-milled impeller, which eliminates "slop" and maximizes output. It is yet another object of the present invention to provide an impeller and a method of manufacturing an impeller that maintains a set and precise flow path through and around the blades or vanes of the impeller. It is a still further object of the present invention to provide an impeller and a method of manufacturing an impeller that eliminates fit issues and other structural integration problems with prior art impellers. It is a still further object of the present invention to provide an impeller and a method of manufacturing an impeller that provides stabilized blades or vanes and minimizes the possibility of fatigue and fracture at various failure points.

Accordingly, I have invented an impeller which includes a plurality of longitudinally extending blades, each having a first edge and a second edge. A cover member, which includes an inlet orifice, extends adjacently along at least a portion of the first edge of each of the plurality of blades. Further, a hub member extends adjacently along only a portion of a second edge of each of the plurality of blades. The cover member, the plurality of blades and the hub member are milled from a single, metal-based material of construction to form an integral, uniform structure.

I have also invented a kit for an impeller assembly which includes a plurality of longitudinally-extending blades, each having a first edge and a second edge. A cover member having an inlet orifice extends adjacently along at least a portion of the first edge of each of the plurality of blades. A hub member extends adjacently along only a portion of the second edge of each of the plurality of blades, and the cover member, the plurality of blades and the hub member are milled from a single, metal-based material of construction to form an integral, uniform structure. A hub enclosure ring is provided and configured for attachment to the hub member, a portion of the second edge of at least one of the plurality of blades, or any combination thereof.

I have also invented a method of manufacturing an impeller which includes the steps of: milling, from a single, metal-based material and as an integral, uniform structure, a plurality of longitudinally-extending blades, each having a first edge and a second edge, a cover member having an inlet orifice and extending adjacently along at least a portion of the first edge of each of the plurality of blades, and a hub member extending adjacently along at least a portion of the second edge of each of the plurality of blades; and attaching a hub enclosure ring to the hub member, a portion of at least one of the plurality of blades, or any combination thereof. This attaching step can include welding, brazing, connecting, joining, fixing, adhering, or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

Figure 1:
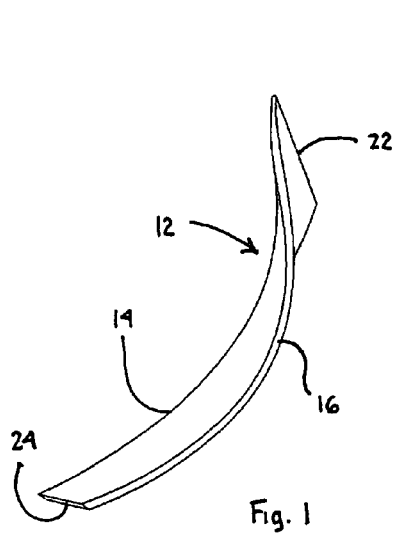
FIG. 1 is a perspective view of a blade of an impeller according to the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to an impeller 10, an impeller assembly 100 and methods of manufacturing such an impeller 10 and impeller assembly 100. The impeller 10, impeller assembly 100 and the various components and subcomponents that comprise these structures are illustrated in various views and in various intermediate stages of manufacture in FIGS. 1-11. Further, the impeller 10 and impeller assembly 100 of the present invention can be used in connection with a variety of applications and within a variety of devices, such as compressors, pumps and the like. For example, the impeller 10 and impeller assembly 100 of the present invention are particularly useful in connection with a centrifugal compressor, where flow path integrity and blade rigidity are of the utmost importance.

Figure 2:
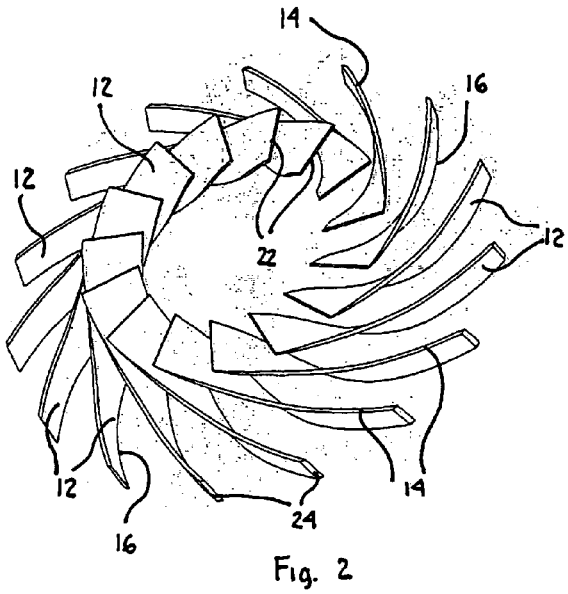
FIG. 2 is a perspective view of a plurality of blades in an arrangement and for use in connection with an impeller according to the present invention.

The impeller 10 of the present invention includes multiple blades 12. These blades 12 are illustrated in FIGS. 1 and 2. As seen in these drawings, each blade 12 is a longitudinally-extending member having a "cover edge", hereinafter referred to as a first edge 14 and a "hub edge", hereinafter referred to as a second edge 16. As discussed in detail hereinafter, these blades 12 may have a variety of shapes and contours, and may be spaced about the impeller 10 in a variety of patterns in order to achieve the intended flow paths, effects and other functions of an impeller. Typically, the blades 12 are arranged in the spaced and spiral pattern illustrated in FIG. 2.

Figure 3:
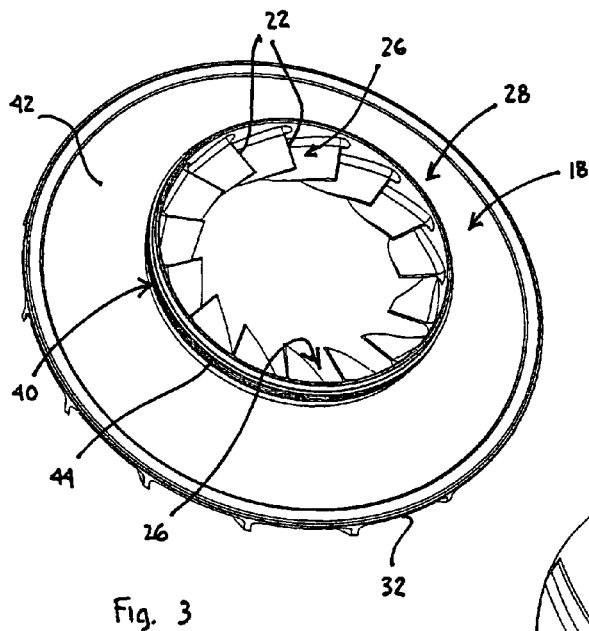
FIG. 3 is a perspective view of a portion of a final machined impeller according to the present invention with certain parts of the hub portion removed for clarity.
Figure 4:
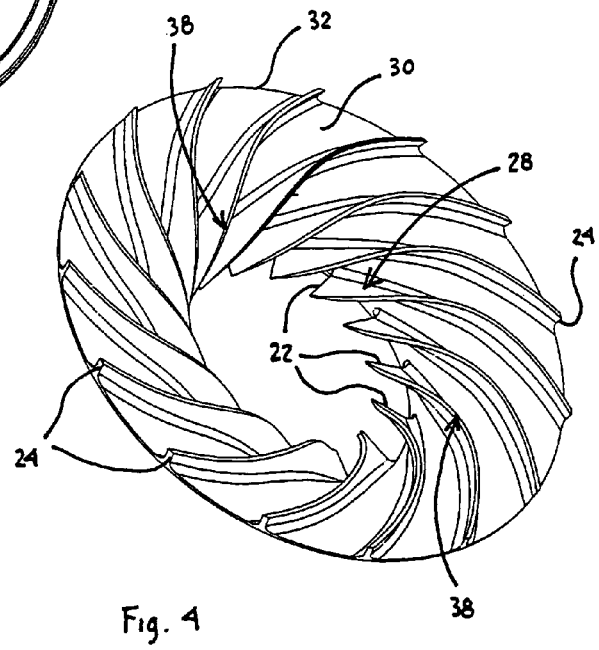
FIG. 4 is a further perspective view of the impeller of FIG. 3.

The impeller 10 further includes a cover member 18 having an inlet orifice 20. In addition, this cover member 18 extends adjacently along at least a portion of the first edge 14 of each blade 12. In one embodiment, the cover member 18 extends along the entire first edge 14 of each blade 12 from a leading edge 22 to a trailing edge 24. It is the arrangement of multiple blades 12 in connection with the remaining components of the impeller 10 that provides fluid channels 26 between each of the blades 12, with the fluid, e.g., air, water, liquid, etc., moving through the inlet orifice 20 of the cover member 18 and along each channel 26 formed between adjacent and spaced blades 12. Accordingly, multiple channels 26 are defined between the adjacent blades 12, where each blade 12 extends from a central portion 28 of an inner surface 30 of the cover member 18 to an outer edge 32 of the cover member 18. Accordingly, the spiral pattern of channels 26 is defined by the blades 12 on the inner surface 30 of the cover member 18, as best illustrated in FIGS. 3 and 4.

Figure 5:
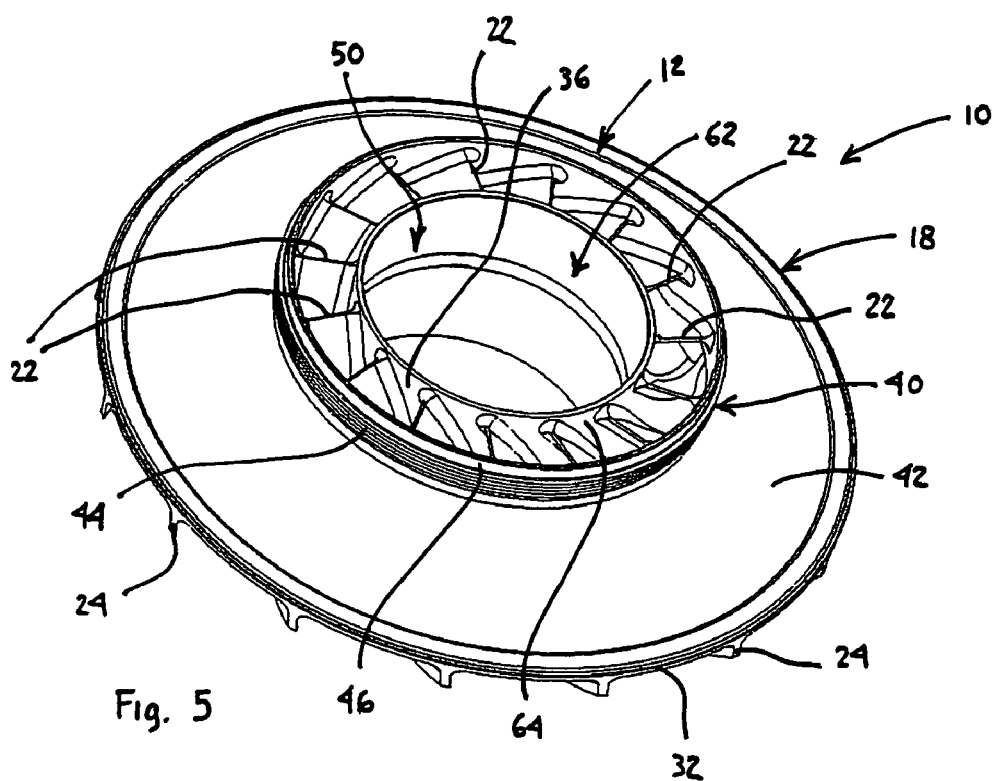
FIG. 5 is a perspective view of an impeller according to the present invention.
Figure 6:
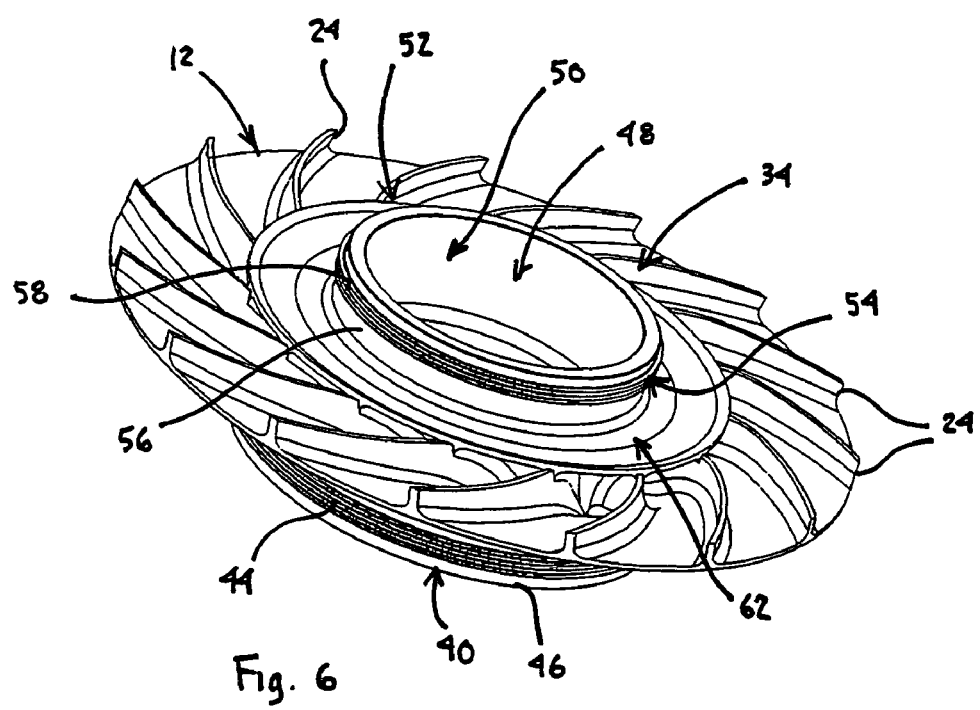
FIG. 6 is a further perspective view of the impeller of FIG. 5.

The impeller 10 also includes a hub member 34. The hub member 34 extends adjacently along only a portion of the second edge 16 of each of the blades 12. As seen in FIGS. 5 and 6, a surface 36 of the hub member 34 extends along a central portion 38 of each blade 12, and completes the flow path between the blades 12 in operation. As with the cover member 18, the hub member 34 extends from the leading edge 22 of each blade 12, along the second edge 16 of the blade 12 and terminates along a portion of each blade 12. With respect to the construction of the impeller 10, the cover member 18, the blades 12 and the hub member 34 are milled from a single, metal-based material of construction to form an integral, uniform structure. Specifically, using a well-known milling process, a single, monolithic, metal material is used to form the impeller 10 as this integral, uniform structure.

This integral, uniform structure, in the form of the impeller 10, may be considered a three-quarter milled design that provides many new and unexpected results, as well as new and unexpected benefits, in a variety of applications and processes. For example, by milling the impeller 10 from a single piece of metallic material, the resulting impeller 10 does not represent a complete one-piece design nor a standard two- or three-piece design, as these designs are known in the industry. Instead the presently-invented impeller 10, in the form of the three-quarter milled design, derives the benefits of these prior art structures. With the blades 12 being integral to the cover member 18 and the inner surface 36 of the hub member 34, the integrity of the critical flow path of the impeller 10 is maintained during welding or brazing. Further, this design will give additional accessibility for milling a variety of more intricate and beneficial blade 12 designs and types, which is simply not available in a one-piece impeller design, due to line-of-sight. Furthermore, the impeller 10 of the present invention demonstrates a greater efficiency than an impeller manufactured in a two-piece structure. Still further, the rigidity of the blades 12 is strengthened, and the leading edge design of each blade 12 is maintained. Still further, the design of the impeller 10 of the present invention eliminates weld problems, such as blade burn-through on smaller impellers. In addition, the present design eliminates milling and welding blind spots and reduces the failure fracture points along the edges of the blades 12 during high volume, high speed or other critical applications.

As discussed above, the cover member 18, blades 12 and hub member 34 are milled from a metal-based or metallic material of construction. This material of construction can be a metal, a semi-metal, an alloy, carbon steel, stainless steel, or any combination thereof. Accordingly, the impeller 10 and the impeller assembly 100 of the present invention are not manufactured by or attainable through a molding process, such as an injection molding process. Instead, the design of the present invention is particularly useful in various high-end applications and for maintaining the appropriate flow characteristics and structural integrity required in such applications.

In one embodiment, the cover member 18 is a substantially circular member, and the inlet orifice 20 is a substantially circular orifice extending through the central portion 28 of the cover member 18. In addition, in this embodiment, the cover member 18 includes an eye 40. This eye 40 extends from an outer surface 42 of the cover member 18 and surrounds and defines the inlet orifice 20.

In a further embodiment, and as best seen in FIGS. 3, 5 and 6, the eye 40 of the cover member 18 includes labyrinth teeth 44. These labyrinth teeth 44 extend around an outer surface 46 of the eye 40. Further, these labyrinth teeth 44 can be used to create a seal between a rotating impeller 10 and a subsequent component of the assembly. For example, abradable seal materials can be disposed on a diaphram portion of a compressor. The use of these abradable seal materials of the diaphragm, intersecting with the labyrinth teeth 44 permit tighter clearances due to rotation of the labyrinth teeth 44, which groove into the sacrificial abradable materials, without damage to the rotor or loss of efficiency.

As best seen in FIGS. 5 and 6, and in one embodiment, the hub member 34 includes a hub member orifice 48 extending through the hub member 34 and defining a bore 50, which terminates at the inlet orifice 20 of the cover member 18. This bore 50 is considered the "impeller bore", and, when used in connection with a compressor, this bore 50 is typically shrunk-fit on the shaft of the rotor of the compressor. As with the cover member 18, the hub member 34 may be a substantially circular member, and the hub member orifice is a substantially circular orifice defining the bore 50 extending through a central portion 52 of the hub member 34. Further, the hub member 34 also includes a heel 54 extending from an outer surface 56 of the hub member 34. This heel 54 surrounds and defines the hub member orifice 48.

Further, as discussed above, this heel 54 may include labyrinth teeth 58 extending around an outer surface 60 of the heel 54. Again, these labyrinth teeth 58 can be used to connect the impeller 10 to various other components of the assembly or otherwise provide interaction between the impeller 10 and other components or subcomponents. It is this bore 50, which extends from the outer surface 56 of the hub member 34 through a hub member body 62, together with the labyrinth teeth 44, 58 of the eye 40 of the cover member 18 and heel 54 of the hub member 34, that provides for the integration and connection of the impeller 10 as part of a larger assembly, such as a compressor or a pump.

When the cover member 18, blades 12 and hub member 34 are finally formed, the channels 26 are further defined, as best illustrated in FIG. 5. In particular, the leading edge 22 of each blade extends between the inner surface 30 of the cover member 18 (specifically at the eye 40 of the cover member 18) and an outer surface 64 of the bore 50. In operation, fluid enters the channels 26 in order to effect operation of the impeller 10.

As discussed above, the three-quarter design of the impeller 10 of the present invention allows for the milling of complex blade 12 designs. As best seen in FIGS. 1 and 2, the blades 12 may have a specified contour and twist along the X-axis, Y-axis and Z-axis between the leading edge 22 of each blade 12 and the trailing edge 24 of each blade 12. Accordingly, the blades 12 can obtain the five-axis design as required in many advanced applications. Such blade design would not be attainable by forming an impeller as a one-piece design structure.

Figure 7:
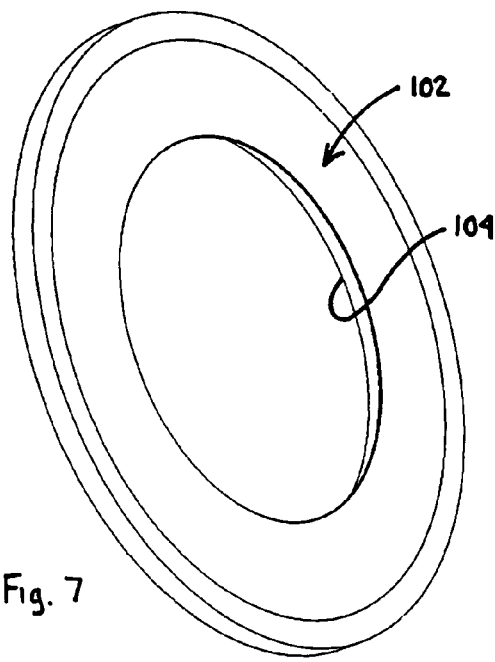
FIG. 7 is a perspective view of a hub enclosure ring in an intermediate stage of manufacturing an impeller according to the present invention.
Figure 8:
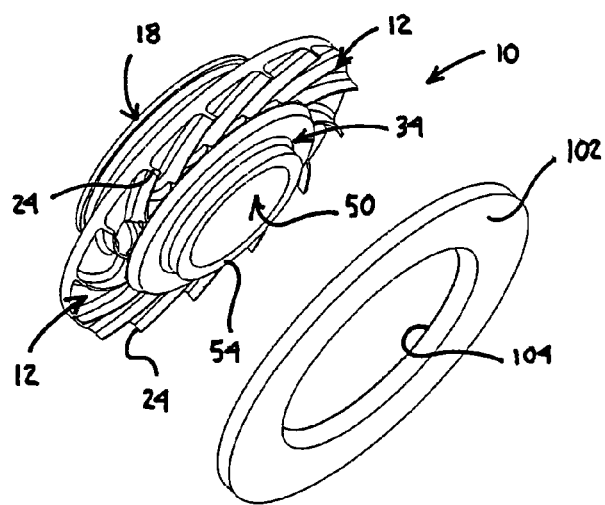
FIG. 8 is a perspective and exploded view of an impeller according to the present invention in an intermediate stage of manufacture.

Turning to FIGS. 7-11, the impeller assembly 100 of the present invention includes an additional piece to complete the assembly. In particular, a hub enclosure ring 102 is provided opposite the cover member 18 of the impeller 10. The hub enclosure ring 102 is illustrated in FIG. 7 (in a pre-machined state), and comprises a circular member that completes the rear portion (or hub member 34 portion) of the impeller 10. In manufacture, the hub enclosure ring 102 is placed over the remaining portions of the second edge 16 of each blade 12 and attached thereto, as shown in an intermediate stage of manufacture in FIG. 8.

Figure 9:
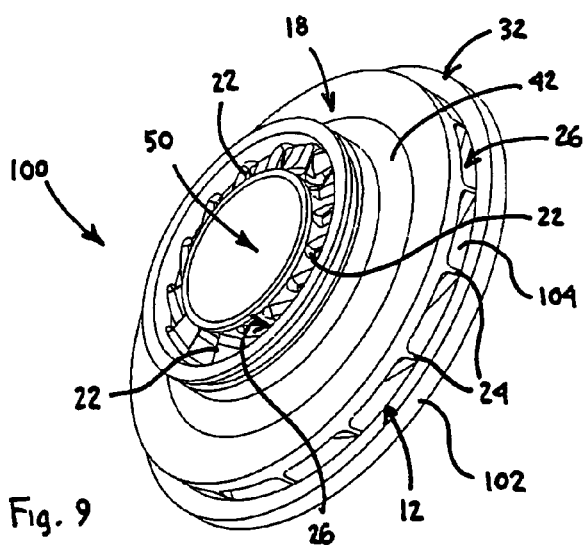
FIG. 9 is a perspective view of an impeller assembly according to the present invention and prior to a final machining step.
Figure 10:
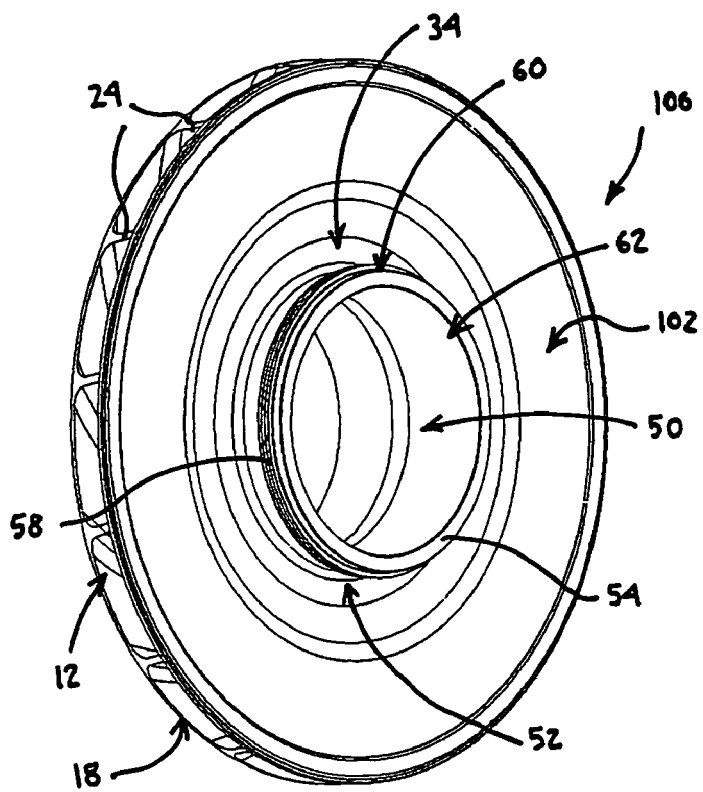
FIG. 10 is a further perspective view of the impeller of FIG. 9 after the final machining step.
Figure 11:
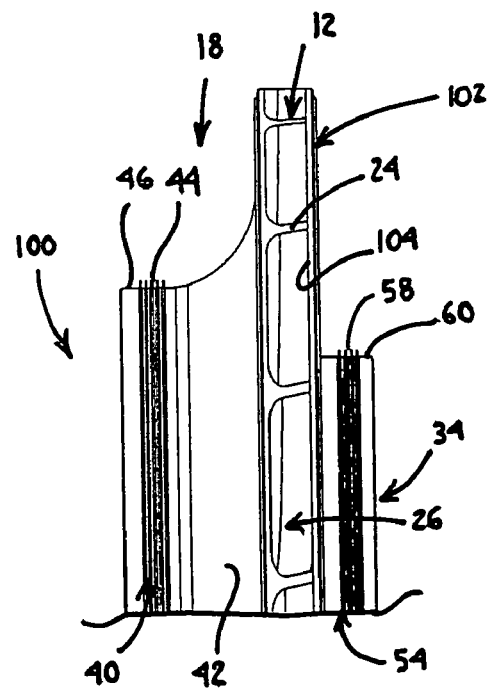
FIG. 11 is an edge view of a further embodiment of a final machined impeller assembly according to the present invention.

Finally, as. shown in FIGS. 9-11, the hub enclosure ring 102 is attached to one or more of the blades 12, and specifically the second edge 16 of the blades 12, to complete the impeller assembly 100. A variety of techniques can be used to attach the hub enclosure ring 102 to the blades 12, such as welding, brazing, connecting, joining, affixing, adhering, or any combination thereof. In one preferred embodiment, an inner surface 104 of the hub enclosure ring 102 is welded or brazed to each of the blades 12, thereby completing the structure of the impeller 10. Since the inner surface 104 does not need to be attached along the entire length of the second edge 16 of each blade 12, any resulting failure or fracture points, which may occur through the welding or brazing process, are eliminated in the critical flow path of the impeller 10. Accordingly, the output of the impeller assembly 100 and impeller 10 is maximized, the blades 12 are stabilized through the use of the integral structure of the impeller 10, the critical flow path is maintained and the failure points are minimized. In addition, the use of the separate hub enclosure ring 102 allows various components to be used in its place in order to eliminate fit issues with integrating the impeller 10 with the various equipment designs and additional assemblies.

In another embodiment, the three-quarter design impeller 10 of the present invention could be reverse manufactured from a single-piece impeller structure. In particular, a portion of the cover member of a full impeller could be removed. Thereafter, the hub enclosure ring 102 could be welded or brazed to the remaining structure.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. An impeller, comprising:
a plurality of longitudinally extending blades, each having a first edge and a second edge;
a cover member having an inlet orifice and extending adjacently along at least a portion of the first edge of each of the plurality of blades; and
a hub member extending adjacently along only a portion of the second edge of each of the plurality of blades;
wherein the cover member, the plurality of blades and the hub member are milled from a single, metal-based material of construction to form an integral, uniform structure, and each of the plurality of blades twists along the x-axis, y-axis and z-axis between a leading edge of each blade and a trailing edge of each blade.

2. The impeller of claim 1, wherein the material of construction is a metal, a semi-metal, an alloy, carbon steel, stainless steel or any combination thereof.

3. The impeller of claim 1, further comprising a hub enclosure ring configured for attachment to the hub member, a portion of the second edge of at least one of the plurality of blades or any combination thereof.

4. The impeller of claim 1, wherein the cover member is a substantially circular member, and the inlet orifice is a substantially circular orifice extending through a central portion of the cover member.

5. The impeller of claim 1, further comprising an eye extending from an outer surface of the cover member and surrounding the inlet orifice.

6. The impeller of claim 5, wherein the eye further includes a labyrinth teeth portion extending at least partially around an outer surface of the eye.

7. The impeller of claim 1, wherein the hub member further comprises a hub member orifice extending therethrough.

8. The impeller of claim 7, wherein the hub member is a substantially circular member, and the hub member orifice is a substantially circular orifice extending through a central portion of the hub member.

9. The impeller of claim 7, further comprising a heel extending from an outer surface of the hub member and surrounding the hub member orifice.

10. The impeller of claim 9, wherein the heel further includes a labyrinth teeth portion extending at least partially around an outer surface of the heel.

11. The impeller of claim 7, wherein the hub member further comprises a bore extending from an outer surface of the hub member and through a hub member body.

12. The impeller of claim 11, further comprising an eye extending from an outer surface of the cover member and surrounding the inlet orifice, wherein each of the plurality of blades includes a leading edge positioned between an inner surface of the eye portion and an outer surface of the bore of the hub member.

13. The impeller of claim 1, wherein the hub member is formed with and extends adjacently along only a central portion of the second edge of each of the plurality of blades.

14. The impeller of claim 1, wherein each of the plurality of blades extends along an inner surface of the cover member from the inlet orifice of the cover member to an outer edge of the cover member, and each of the plurality of blades are substantially equidistantly spaced from each other and about and around the inner surface of the cover member.

15. A method of manufacturing an impeller comprising the steps of:
milling, from a single, metal-based material and as an integral, uniform structure, a plurality of longitudinally extending blades, each having a first edge and a second edge, a cover member having an inlet orifice and extending adjacently along at least a portion of the first edge of each of the plurality of blades, and a hub member extending adjacently along at least a portion of the second edge of each of the plurality of blades; and
attaching a hub enclosure ring to the hub member, a portion of at least one of the plurality of blades or any combination thereof.

16. The method of claim 15, wherein the metal-based material is carbon steel, stainless steel, an alloy or any combination thereof.

17. The method of claim 15, wherein the attaching step comprises welding, brazing, connecting, joining, fixing, adhering or any combination thereof.

18. A kit for an impeller assembly, the kit comprising:
a plurality of longitudinally extending blades, each having a first edge and a second edge;
a cover member having an inlet orifice and extending adjacently along at least a portion of the first edge of each of the plurality of blades;

a hub member extending adjacently along only a portion of the second edge of each of the plurality of blades, wherein the cover member, the plurality of blades and the hub member are milled from a single, metal-based material of construction to form an integral, uniform structure; and a hub enclosure ring configured for attachment to the hub member, a portion of the second edge of at least one of the plurality of blades or any combination thereof;

wherein each of the plurality of blades twists along the x-axis, y-axis and z-axis between a leading edge of each blade and a trailing edge of each blade.

19. The kit of claim 18, wherein the integral, uniform structure, the hub ring or any combination thereof is manufactured from a metal, a semi-metal, an alloy, carbon steel, stainless steel or any combination thereof.

* * * * *

UNITED STATES PATENT AND TRADEMARK OFFICE
CERTIFICATE OF CORRECTION

PATENT NO. : 7,628,586 B2
APPLICATION NO. : 11/320432
DATED : December 8, 2009
INVENTOR(S) : Timothy A. Feher It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Second Day of November, 2010

David J. Kappos
*Director of the United States Patent and Trademark Office*